Figure 1:
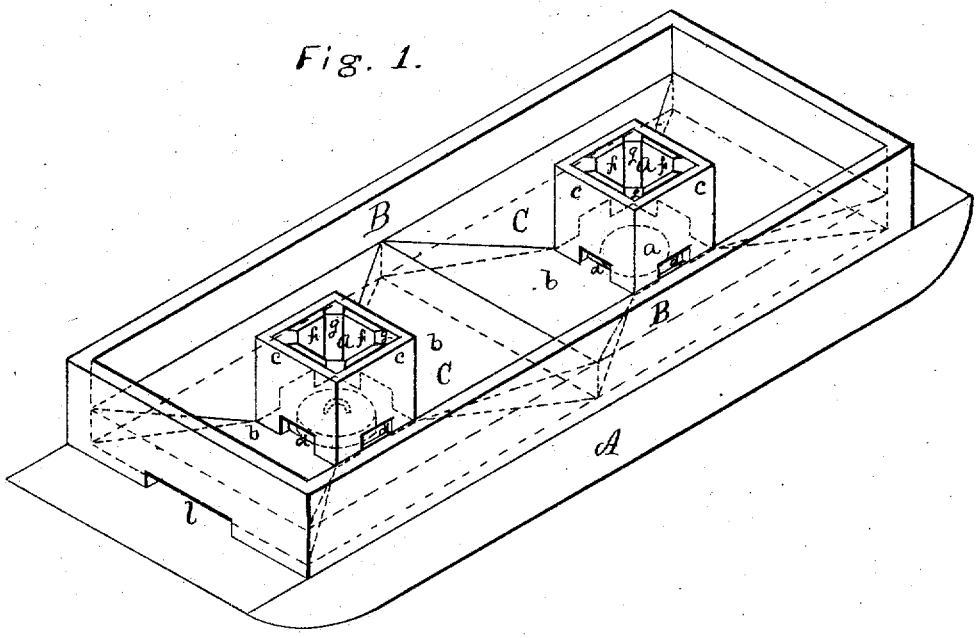

JULIUS A. PRESTON.

Improvement in Hoisting Apparatus for Coal Barges and other Places.

No. 4,801. Reissued March 12, 1872.

Witnesses.

Nettie. Shepard.

C. A. Shepard.

Inventor.

Julius A. Preston,

By James. Shepard. Atty.

AM. PHOTO-LITHOGRAPHIC CO. N.Y. (OSBORNE'S PROCESS.)

UNITED STATES PATENT OFFICE.

JULIUS A. PRESTON, OF NEW HAVEN, CONNECTICUT, ASSIGNOR, BY MESNE ASSIGNMENTS, TO THE AMERICAN COAL-BARGE COMPANY.

IMPROVEMENT IN HOISTING APPARATUS FOR COAL-BARGES AND FOR OTHER PURPOSES.

Specification forming part of Letters Patent No. 69,245, dated September 24, 1867; reissue No. 4,801, dated March 12, 1872.

Specification describing certain Improvements in Coal-Barges and Hoisting Apparatus, invented by JULIUS A. PRESTON, of New Haven, county of New Haven and State of Connecticut.

The object of this invention consists chiefly in dispensing with the manual labor ordinarily required in removing coal, ore, or similar substances from the receptacle in which it is shipped or stored to other receptacles or places for use or storage. Another object is also attained when such receptacles for storage are combined with a barge or floating-dock, by which the coal, ore, &c., may be kept thoroughly drained, or free from any injurious contact with the wash of the sea or from rain, &c. To this end my invention consists, first, in forming the bottom of the receptacle or compartment, where the coal, ore, &c., is stored, so that it shall incline or converge toward a central well or opening, provided with valves or gates which are opened and shut by suitable means. When it is desired to remove the coal, ore, &c., from the receptacle, these gates are opened, and the coal, by reason of the inclined or sloping bottom of the compartment, then runs by its own gravity through the gates and falls into one or more buckets previously placed in the well. As soon as these buckets are filled the gates or valves leading to the well are closed, and the buckets are hoisted out, emptied, and returned to their place to be filled again. It will thus be seen that the buckets are filled automatically and at a great saving of labor and expense. My invention also consists in placing the compartment or receptacle for coal, ore, &c., above the body or hull of a barge, the latter being securely decked over so as to in effect constitute a water-tight compartment, which supports and buoys the receptacle for the cargo, and prevents the cargo from being injured by the water, which, in ordinary barges, is apt to enter the hold of the vessel. In order to drain off any water which may be washed into the receptacle for the cargo, channels or gutters are formed, leading from the lowest point of the sloping bottom of the receptacle to the outside of the vessel, through which the water passes off and is discharged. This method of constructing the barges adapts them especially for use on large rivers or bays, or in the coasting-trade, where, at times, water is rough and the waves are such as to render the employment of ordinary barges impracticable; and it also admits of a greater load being transported than can be done by an ordinary barge of the same dimensions.

To enable those skilled in the art to understand and use my invention, I will now proceed to describe the manner in which the same is or may be carried into effect by reference to the accompanying drawing.

Figure 2:
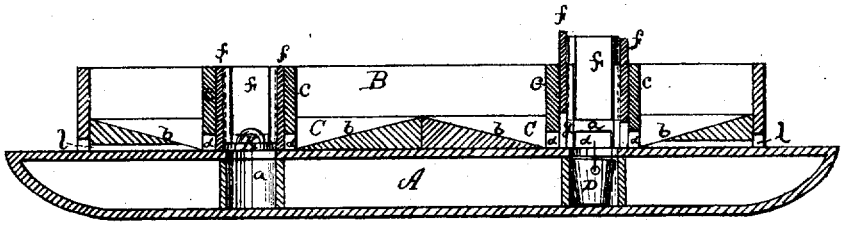

Figure 1 is a perspective view of a barge and receptacles constructed in accordance with my invention. Fig 2 is a longitudinal and vertical section of the same.

As the receptacle and its attachments are the same when used to remove coal, &c., from the deck of a barge or other vessel, as they are when used to remove it from any other platform or surface, it will be sufficient to explain them as used on a barge.

A represents the body or hull of the barge, and B the compartment where the coal is stored. For the reasons above given, the compartment B is placed above the body of the barge, which, as shown in the drawing, is decked over so as to be completely water-tight, if need be. The sides of the receptacle B, which may be on a barge, or dock, or other place, are formed in any suitable manner, and extend up to any desired height. The receptacle shown in the drawing is divided into two parts, each provided with a well or opening, *a*, in its center. This well extends down into the hold of the vessel or other place below the level of the floor or bottom of the coal-receptacle, and is continued up above the bottom *b* by means of a box or frame, *c*, the top of which is about on a level with the top of the receptacle. A series of openings, *d*, are formed in the side of this frame, at or near the bottom of the receptacle, which are opened and closed by means of valves or gates *f*, which slide up and down between ways *g*, formed in the interior of the box. The bottom or floor of the receptacle is constructed so as to converge or slope toward these openings *d*, forming, as it were, a hopper, which, when the gates *f* are open, feeds the coal to the bucket placed in the well. The highest part of the floor is nearest the outer sides of the receptacle, and it thence slopes downward to the openings *d*. Now, supposing the receptacle B to be filled with coal and the gates *f* open, the coal will, by its own gravity, run through the openings *d* and fill the bucket *h* placed in the well. As soon as the bucket is filled the gates *f* are closed, and the bucket hoisted out by suitable means and replaced by another. The whole operation of filling the buckets is thus rendered automatic.

The arrangement of the well *a* and of the floor of the coal-receptacle may be greatly varied without departing from the principles of my invention. There may be as many wells as desired, depending upon the size and capacity of the barge; or the well may extend continuously from one end to the other of the receptacle, the floor upon each side sloping toward it in such manner that when the gates or valves *f* are open the coal shall be forced forward by its own gravity through the ports *d*. In order to drain off the water which may at times enter the receptacle, I form channels *l* in the barge, which lead from the lowest point of the floor to the exterior of the vessel, as seen clearly in Fig. 2. The water in the compartment flowing downward over the sloping bottom reaches at last the channels *l*, through which it passes until it is discharged from the vessel. The location of these channels can, of course, be varied as circumstances may require.

Having now described my invention, and the manner in which it is or may be carried into effect, what I claim, and desire to secure by Letters Patent, is—

1. The combination, in a coal-barge or other place where coal is stored, in a freight receptacle or compartment having an inclined or sloping bottom, as described, of a well and suitable means for opening and closing the same, substantially as and for the purposes herein set forth.

2. The combination, in a compartment for holding coal, as described, of the well or opening, with its surrounding frame, and valves or gates for regulating the flow of the coal or other granular freight into the said well, substantially as herein shown and specified.

3. The combination, with the freight compartment or receptacle and its inclined bottom, of one or more channels for drawing off the water from said compartment, substantially as herein set forth.

4. A barge for transporting coal and other freight, in which the compartment for receiving such freight is combined with the body or hull of the barge, substantially as herein shown, and for the purposes set forth.

JULIUS A. PRESTON.

Witnesses:
D. R. WRIGHT,
B. PHELPS.